No. 768,044. PATENTED AUG. 23, 1904.
P. HANSON.
MOWING MACHINE.
APPLICATION FILED MAR. 4, 1902.
NO MODEL. 5 SHEETS—SHEET 2.
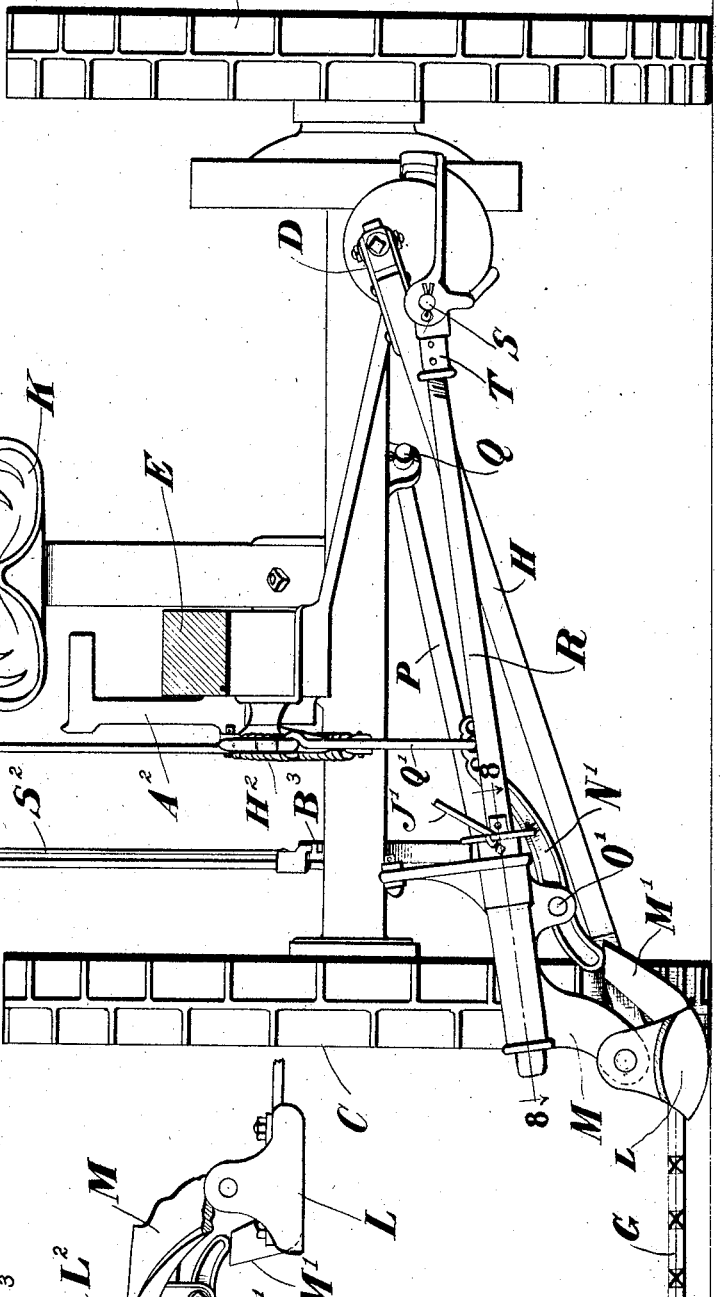
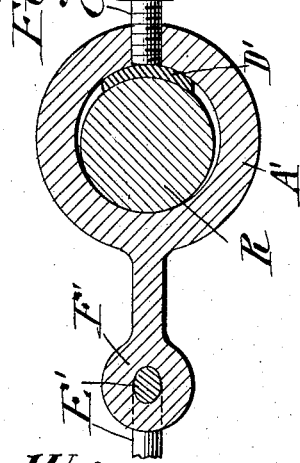
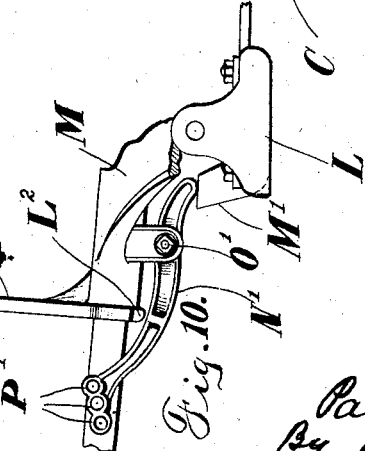

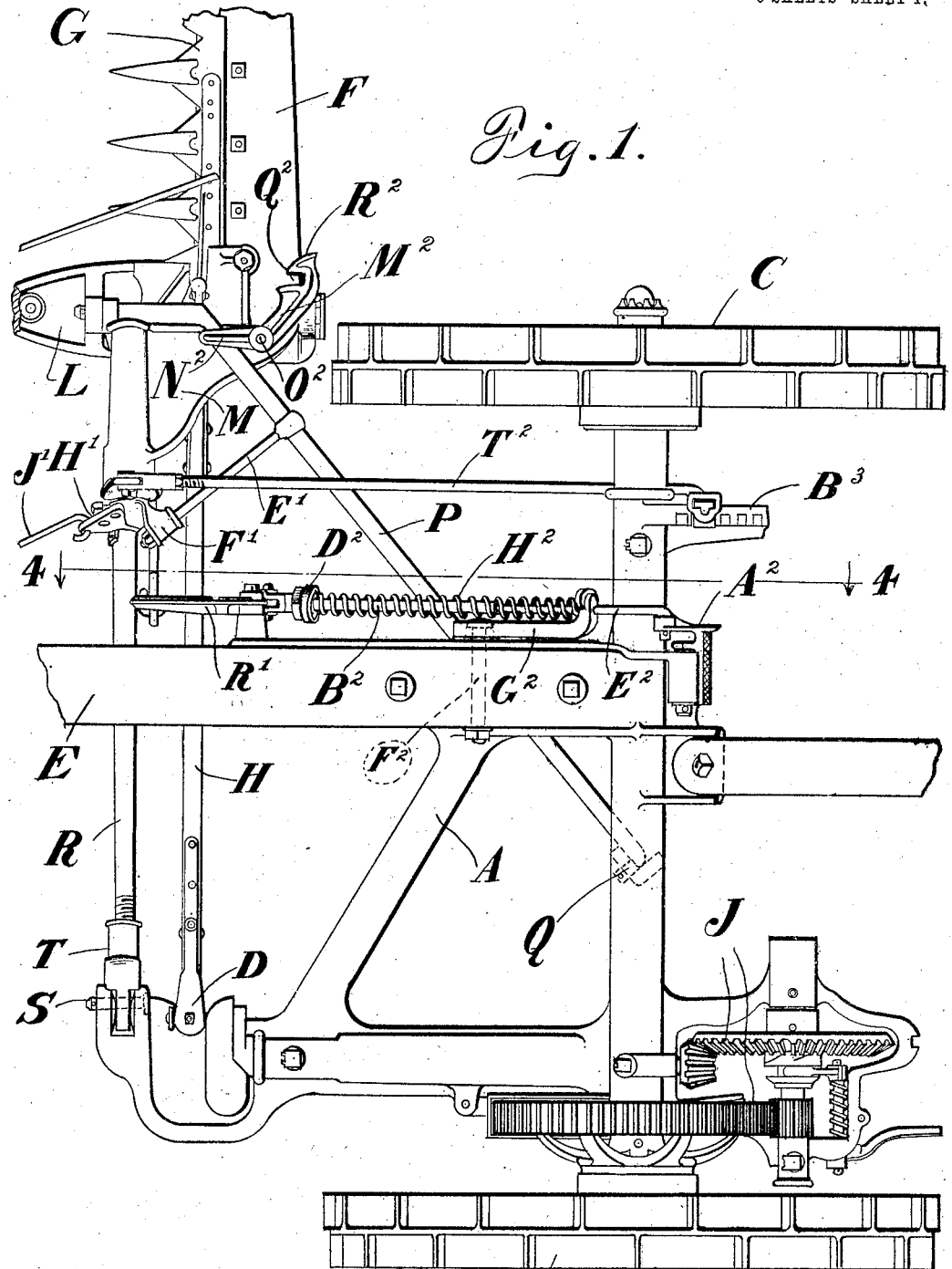

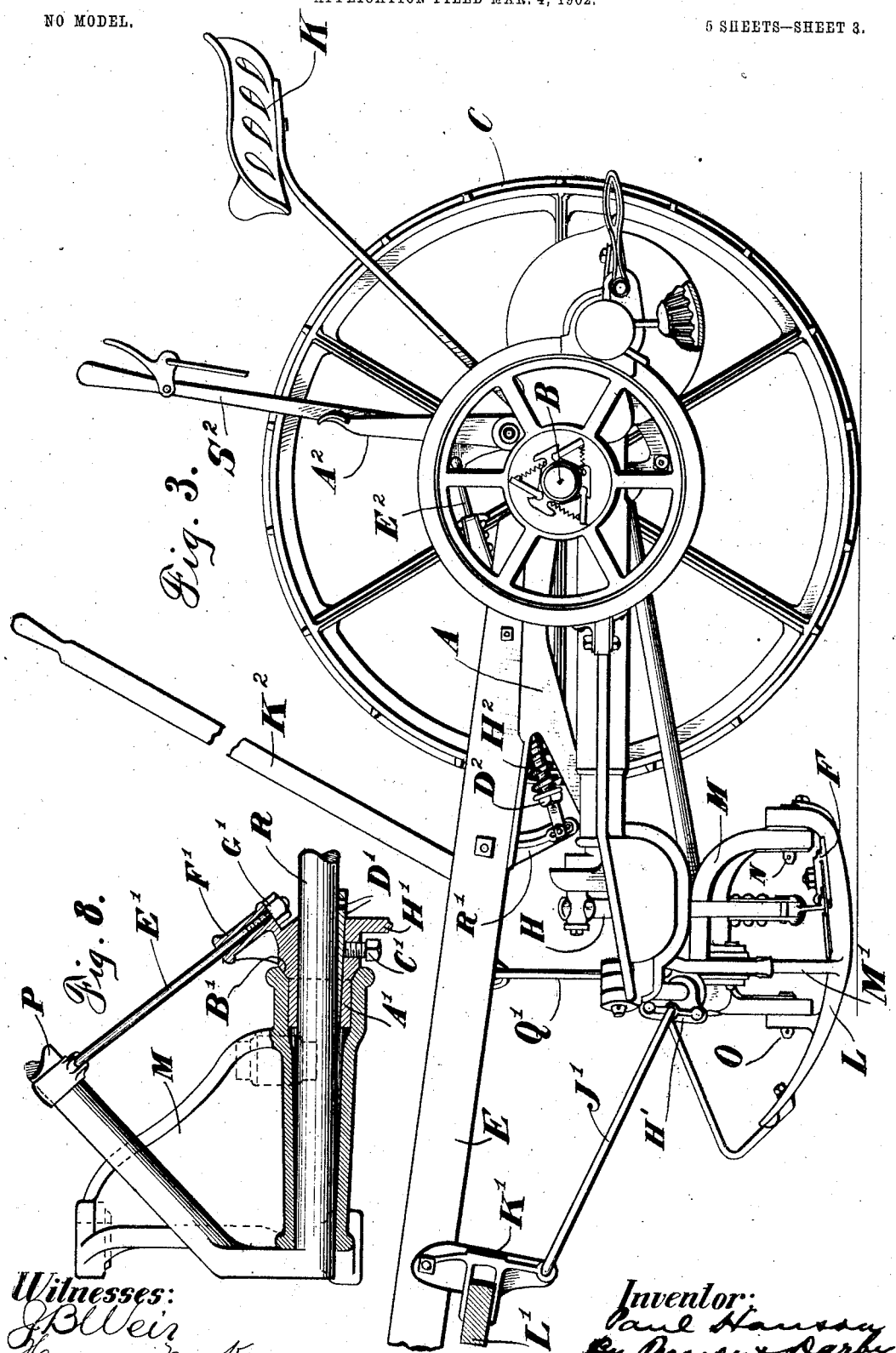

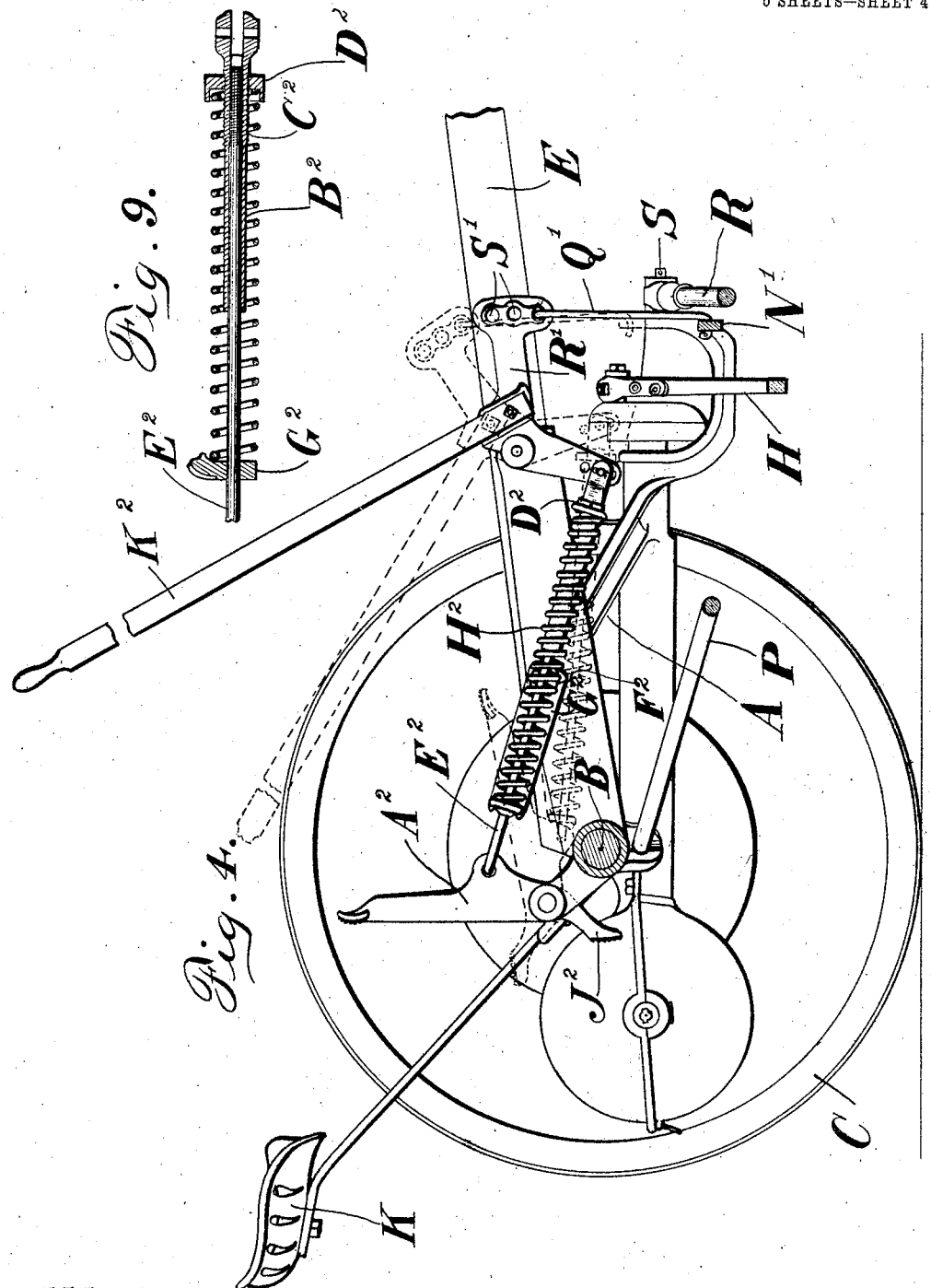

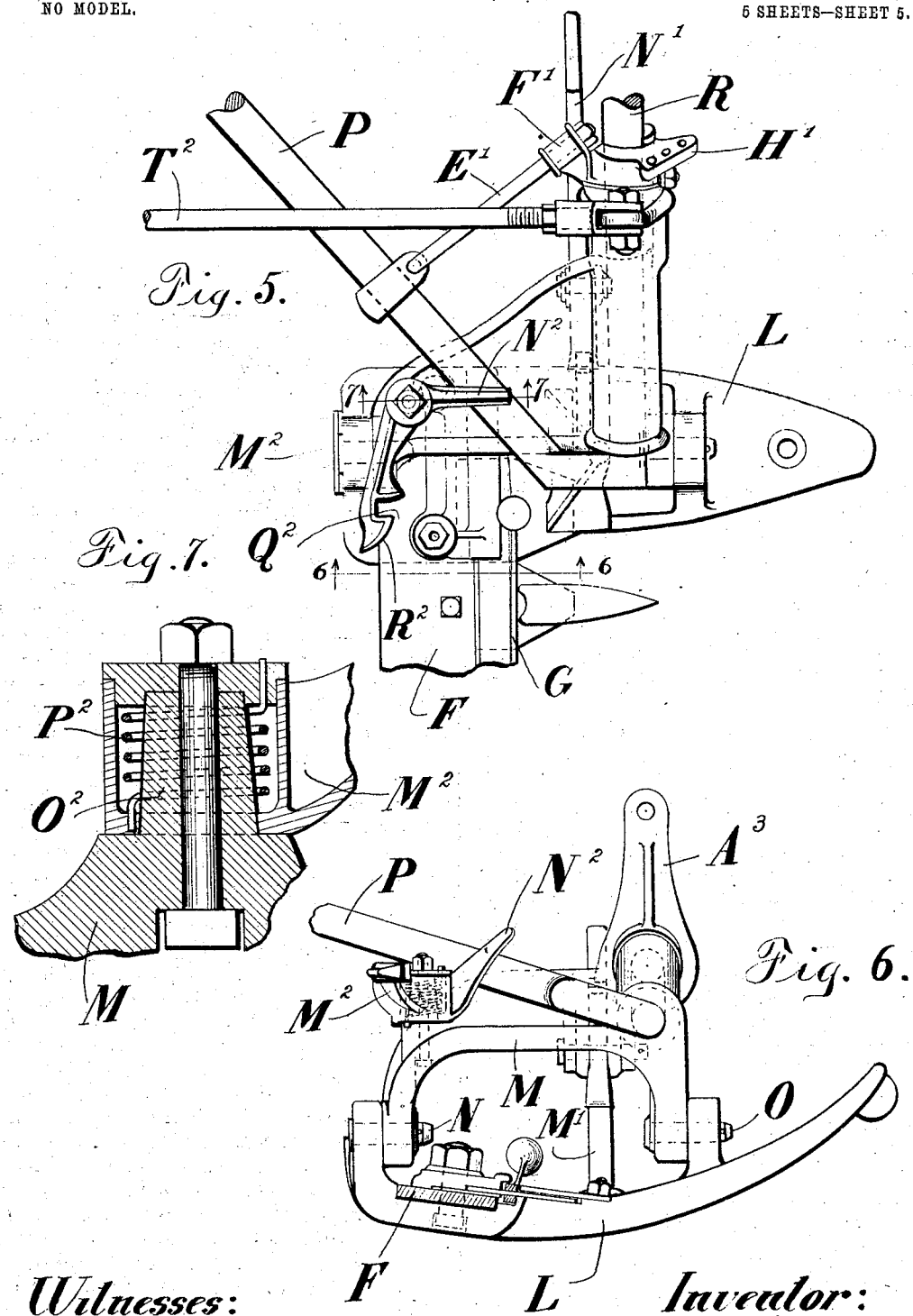

No. 768,044. Patented August 23, 1904.

UNITED STATES PATENT OFFICE.

PAUL HANSON, OF ST. PAUL, MINNESOTA.

MOWING-MACHINE.

SPECIFICATION forming part of Letters Patent No. 768,044, dated August 23, 1904.

Application filed March 4, 1902. Serial No. 96,645. (No model.)

*To all whom it may concern:*

Be it known that I, PAUL HANSON, a citizen of the United States, residing at St. Paul, in the county of Ramsey and State of Minnesota, have invented a new and useful Mowing-Machine, of which the following is a specification.

This invention relates to mowing-machines.

The object of the invention is to improve the construction of mowing-machines and to render the same more efficient in operation.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in plan, parts broken off, of a mowing-machine embodying the principles of my invention. Fig. 2 is a view in front elevation, parts in vertical transverse section. Fig. 3 is a view in side elevation, parts broken off. Fig. 4 is a longitudinal central section on the line 4 4, Fig. 1, looking in the direction of the arrows and showing in dotted lines a displaced position of the parts. Fig. 5 is a broken detail view in plan, somewhat enlarged, showing the automatic finger-bar-locking device and the means for bracing the coupling arm or bar. Fig. 6 is a transverse section on the line 6 6, Fig. 5, looking in the direction of the arrows. Fig. 7 is a broken detail view in vertical section on the line 7 7, Fig. 5, looking in the direction of the arrows. Fig. 8 is a broken detail view in plan, parts in horizontal section, on the line 8 8, Fig. 2, showing the means for taking up wear of the yoke upon the coupling arm or bar and the means for bracing the latter. Fig. 9 is a detail view in longitudinal section of the lifting-spring, showing the manner of applying and adjusting the same. Fig. 10 is a broken detail view showing the manner of applying the gag-lever. Fig. 11 is a detail view in section transversely across coupling arm or bar R and the adjusting-sleeve A.

The same part is designated by the same reference-sign wherever it occurs throughout the several views.

In the drawings reference-sign A designates a framework in which is journaled an axle B, upon which are mounted the supporting-wheels C. E is the tongue of the machine, suitably mounted in any convenient manner upon the frame. F is the finger-bar; G, the sickle or cutter bar; H, the pitman for actuating the sickle-bar; J, the gearing through which the sickle-bar is actuated and which in turn is driven from the main axle B; K, the driver's seat; L, the shoe upon which the finger-bar is mounted; M, the yoke upon which the shoe is pivoted, as at N O. (See Figs. 3 and 6.) These parts so far mentioned may be of the usual or any ordinary construction and arrangement and in the specific details thereof form no part of my present invention.

P designates a brace pivotally connected to the main frame at a convenient point, as at Q. (See Figs. 1 and 2.) Forming part of brace P or rigidly connected thereto in any suitable or convenient manner is the coupling arm or bar R, suitably hinged or pivoted, as at S, to the main frame. This connection of the coupling arm or bar to the main frame may be an adjustable connection—as, for instance, by threading the end of said coupling arm or bar into a sleeve T, the latter being pivotally connected. By this means I secure an adjustable connection of the coupling arm or bar to the frame in such a manner that by turning up or backing off the sleeve T upon the threaded end of said arm or bar said bar may be lengthened or shortened, thereby adjusting the finger-bar and arm R relative to the point of connection of the sickle or cutter bar to its actuating-pitman, thus providing against derangement of the proper relation of said parts by any inaccuracies or defects in the manufacture of the parts. In the form shown in Fig. 8, but to which I do not desire my invention to be limited or restricted, the coupling arm or bar R is shown formed integrally with the brace P. The yoke M, upon which the shoe L is pivoted, is sleeved upon the bar R, as most clearly shown in Fig. 8, for rotative adjustment thereon. In order to take up any wear or looseness of the sleeved bearing of the yoke upon the coupling arm or bar, I provide said sleeve with an enlarged inner chamber in the end of which is received an adjusting-sleeve A'. This adjusting-sleeve is provided with a beveled shoulder (indicated at B', Fig. 8) arranged to contact with a similarly-shaped shoulder upon the hub of the yoke-sleeve, so that by forcing the adjusting-sleeve A' into the open end of the hub of the yoke-sleeve more or less the desired adjustment for wear of the parts may be effected. The wear-adjusting sleeve A' may be held in any desired position of adjustment in any desired manner—as, for instance, by means of set-screw C'. If desired, and in order to secure additional adjustment for maintaining alinement of the cutter or sickle bar with reference to its actuating-pitman, the opening through the wear-adjustment sleeve A' and through which passes the coupling-arm R may be so shaped that a wedge-key D' may be driven into said opening and between the inner bearing-surface of the adjusting-sleeve and the exterior surface of the coupling-arm at a convenient point peripherally around the coupling arm or bar, thereby adjusting the inclination of the sleeve of the yoke relatively to the coupling arm or bar, and hence adjusting the finger-bar and cutter-bar into proper alinement with respect to the cutter-bar-operating pitman, and, if desired, the wedge-key D' may be held in position by the set-screw C', or otherwise, as may be most convenient.

In machines of this class it is desirable to provide a rigid support for the yoke or cutter-bar supporting mechanism, so as to prevent bending or buckling of the same in case the cutter-bar encounters an undue obstruction opposing its advance along the ground. I have provided an exceedingly-simple arrangement for accomplishing this purpose, wherein I employ a cross-brace E' between the brace-bar portion P and the coupling-arm portion R. A convenient arrangement is shown wherein the cross-brace connection E' is suitably secured or sleeved upon brace P at one end and at the other end is received through a bearing formed in an extension F' of the casting forming the adjusting-sleeve A'. The end of the cross-brace connection E', which operates loosely through the bearing F', is threaded, and a nut G' is mounted upon the threaded end of said cross-brace connection, so as to enable proper adjustment to be made in this cross-brace connection. In this manner the brace P and bar R are rigidly held together and the latter efficiently braced, so as to prevent bending or buckling in case the cutter-bar should encounter an undue obstruction, and by this construction I am enabled to make the coupling arm or bar R light, thereby reducing its cost and without sacrificing anything of efficiency or strength and rigidity, and by making the connection of cross-brace E' with the adjusting-sleeve A' loose and adjustable provision is made for the proper adjustment of said sleeve A' to take up wear of the yoke-sleeve. The adjusting-sleeve A' is provided with a flange extension H', having a series of holes or openings therein, into any one of which may be hooked the end of a draft rod or link J', the other end of said draft rod or link being connected to a bracket or casting K', suitably connected to the tongue E of the machine, and which may also afford means for connecting the draft appliances—as, for instance, through a cross-bar or doubletree L'.

Upon the shoe L is formed a lug or extension M', arranged to form a bearing for one end of the gag-lever N', said gag-lever being pivotally connected, as at O', upon a hanger or bracket of the yoke M. (See Figs. 2 and 10.) At its other end this gag-lever is provided with a series of openings P', into any one of which is adapted to be received a lifting-link Q'. The other end of said lifting-link is adapted to be connected to one arm of a bell-crank lever R'. This connection may be adjustable—as, for instance, by providing said arm of the bell-crank lever with a series of openings S', into any one of which the lifting-link Q' may be hooked. $A^2$ designates a foot-lever pivotally mounted upon the frame of the machine at a convenient location with reference to the driver's seat to be manipulated by the foot of the driver, and a suitable connection is interposed between said foot-lever $A^2$ and the other arm of the bell-crank lever R'. The purpose and function of this foot-lever are to effect the raising and lowering of the shoe L and the raising and lowering of the outer end of the finger and cutter bar. In order to relieve the driver or operator of as much weight as possible in raising and lowering the shoe or the outer end of the finger and cutter bar, it is usual to interpose a lifting-spring between the foot-lever and the gag-lever at some convenient point, this lifting-spring being applied so as to exert a lifting effort tending to counterbalance the weight of the shoe and parts supported thereon. In the provision of a lifting-spring of the nature referred to and having the operation and purpose mentioned it is necessary to make suitable provision for the rocking movements of the foot-lever and of the bell-crank lever through which the gag-lever is operated. It is also desirable to provide means for securing proper and desirable adjustments of the tension of the lifting-spring. It is also desirable to provide means whereby when the shoe is elevated or raised to its highest point the parts may be locked in position, and the locking means should be such as to be capable of being readily released when necessary or desirable.

I will now describe constructions and arrangements embodying features of my invention whereby these results are accomplished in a simple and efficient manner. Suitably connected to an arm of bell-crank lever R' in a manner to be adjusted thereon or relatively thereto is a sleeve $B^2$, said sleeve being exteriorly threaded for a portion of the length thereof, as indicated at $C^2$, Fig. 9, and mounted upon this threaded portion is an adjusting-nut $D^2$. The sleeve $B^2$ is interiorly threaded for a portion of the length thereof, into which is screwed one end of a rod $E^2$, said rod being exteriorly threaded for a portion of the length thereof for this purpose. The rod $E^2$ projects beyond the free end of casing $B^2$ and is loosely hooked or otherwise pivotally connected to the foot-lever $A^2$. Pivotally mounted at a suitable and convenient point upon the framework—as, for instance, at $F^2$—is an arm $G^2$, the free end of said arm being outwardly turned, as clearly shown in Fig. 1, and provided with an opening therethrough and through which rod $E^2$ loosely projects. Suitably interposed between the abutment afforded by the outwardly-turned end of arm $G^2$ and the adjustable nut $D^2$ is a spring $H^2$. A convenient arrangement is shown wherein said spring is coiled upon the casing $B^2$ and rod $E^2$. From this description it will be seen that the tension of spring $H^2$ being exerted at one end against nut $D^2$, which is mounted upon sleeve $B^2$, the latter being connected to an arm of the bell-crank lever $R'$ and at its other end against an abutment fixed to the framework of the machine, is constantly exerted in a direction to rock the bell-crank lever, so as to raise the lifting-link $Q'$ and to rock gag-lever $N'$, so that the free end of the latter will bear upon the seat or bearing lug $M'$ of shoe $L$. It will also be seen that the tension of said spring may be readily adjusted by turning up or backing off the adjusting-nut $D^2$. It will also be seen that the rod $E^2$ and sleeve $B^2$ together form a rigid connection between the foot-lever $A^2$ and the bell-crank lever $R'$; but such connection is adjustable by reason of the threaded connection of the rod and sleeve. By this construction I am enabled to turn out these parts in quantities and can bring all the parts when assembled in a machine into proper relation whatever may be the slight inequalities in length resulting from the processes of manufacture. Moreover, by suitably adjusting the connection between foot-lever $A^2$ and bell-crank lever $R'$, I am enabled to adjust the angle of inclination of the former, so as to accommodate the convenience of the driver and the angle at which he applies the foot-power in the work of operating the gag-lever. It will also be seen from the foregoing description that the lifting-spring $H^2$ is a compression-spring and while held under compression in the manner set forth operates as a counterbalance for taking up or counterbalancing a portion of the weight of the parts to be lifted by the gag-lever. The pivotal point $F^2$, at which the arm $G^2$ is pivotally connected to the frame of the machine, should be so relatively positioned as to be substantially or approximately crossed by the connection between the foot-lever $A^2$ and bell-crank lever $R'$ in whatever positions said levers may occupy during the operation of this part of the apparatus. At the same time said arm $G^2$ is permitted to vibrate upon its pivot whenever foot-lever $A^2$ is rocked in the manipulation of the device, and in order to lock the parts—as, for instance, when the gag-lever has been operated to its fullest extent—the point of pivotal connection of rod $E^2$ to the foot-lever $A^2$ will be carried to a point below a straight line connecting the point of pivotal connection of foot-lever $A^2$ to the main frame and the point of pivotal connection of sleeve $B^2$ to the arm of bell-crank lever $R'$, thereby locking the parts in their extreme position. At this point the foot-piece of the foot-lever (see Fig. 2) engages the tongue of the machine, thereby forming a stop. In order to release this lock readily and easily and by the foot of the operator or driver, I provide the foot-lever $A^2$ with an extension $J^2$, (see Fig. 4,) adapted to be engaged by the heel or foot of the driver and whereby power may be applied to the foot-lever $A^2$ to rock the same in a direction to return the point of pivotal connection of rod $E^2$ with said foot-lever from past the dead-center or dead-line, above referred to, thereby permitting the parts to be restored to their original or normal position.

If desired and in order to afford additional means for operating the gag-lever, a hand-lever $K^2$ may be suitably connected to the bell-crank lever $R'$ and arranged to extend into convenient position to be manipulated by the hand of the driver. This hand-lever may be readily detached, if desired, and the apparatus operated solely from the foot-lever $A^2$. In the operation of this part of my invention the foot-lever $A^2$ is rocked in a direction away from the seat K, thereby projecting the connection between said foot-lever and the arm of bell-crank lever, hence rocking said bell-crank lever, thereby exerting a vertical pull upon lifting-link $Q'$, and hence rocking gag-lever $N'$ and causing the free end thereof, which bears upon lug $M'$, to effect a rocking movement of shoe $L$ about its pivots $O$ $N$, and consequently raising the outer or free end of the finger-bar. This movement continues until the gag-lever abuts against a shoulder or stop $L^2$ on the yoke, thereby preventing a further rocking movement of the gag-lever. The continued rocking movement of foot-lever $A^2$ thereafter serves to raise the shoe to rock the coupling-arm or drag-bar and the brace P about their points of pivotal connection with the frame and the yoke and associated parts, thereby lifting or raising the inner end of the finger-bar, as well as the outer end thereof, in a well-understood manner. It is desirable to provide means for locking the finger-bar in a vertical position—as, for instance, during the transportation of the machine from one field to another or for convenience in storing the same.

In accordance with the principles of my invention I provide an exceedingly simple and efficient automatic locking device arranged to engage the finger-bar in any suitable manner when in its vertical position to form a lock therefor. This idea may be embodied in many specifically different constructions. I have shown a simple arrangement for accomplishing the desired object, wherein I provide a locking-lever $M^2$, in the form of a bell-crank, having one end thereof arranged as a tailpiece $N^2$ to extend over brace-bar P and to bear thereon. This locking-lever $M^2$ is pivotally mounted at its angle upon yoke M, as upon a stud or boss $O^2$, formed on yoke M. (See Fig. 7.) A spring $P^2$ is applied to said locking-lever in a manner to rock the locking-arm of said lever into engaging relation with respect to the back or rear edge of finger-bar F. This locking-arm is provided with a hook or seat $Q^2$ in its outer or free end, into which the rear edge of the finger-bar snaps when said bar has been raised into its vertical or upright position. The nose $R^2$ of said locking lever or latch is beveled, so as to facilitate the movement of the finger-bar therepast and into position for the hook to snap over the rear edge thereof into engaging and locking relation with respect thereto. This locking-latch may be released when it is desired to lower the finger-bar into horizontal position in any suitable or convenient manner. In the particular form shown, to which, however, my invention is not limited or restricted, I arrange the tailpiece $N^2$ to extend over the brace P, and since said brace is inclined downwardly toward the outer end thereof, as clearly shown in Figs. 2 and 6, it will be seen that by imparting a rocking movement to the yoke M upon its bearing-support upon drag-bar or coupling-arm R said tailpiece $N^2$ will be brought into contact with brace P, thereby rocking the locking-latch and releasing the hooked end thereof from engaging relation with respect to the finger-bar. The tilting movement of the yoke may be imparted in the ordinary manner through a tilting-lever $S^2$, suitably arranged in convenient relation to the driver's seat and adjustably connected by a link or rod $T^2$ or otherwise in the usual manner to arm $A^3$, formed on or connected to the yoke. Through this tilting-lever I am also enabled to secure the desired vertical tilt of the points of the cutters, as occasion requires, said lever being held in its desired position of adjustment in any suitable, well-known, or convenient manner—as, for instance, by the ratchet-segment indicated at $B^3$, Fig. 1.

It is obvious that many variations and changes in the details of construction and arrangement would readily suggest themselves to persons skilled in the art and still fall within the spirit and scope of my invention. I do not desire, therefore, to be limited or restricted to the exact details of construction and arrangement set forth; but

Having now described the object and nature of my invention and a construction embodying the principles thereof and having explained such construction, its purpose, function, and mode of operation, what I claim as new and useful and of my own invention, and desire to secure by Letters Patent of the United States, is—

1. In a mowing-machine, the combination with a coupling arm or bar, of a yoke sleeved upon said bar, a shoe carried by said yoke, and a cutter and a finger-bar carried by said shoe, and a sleeve mounted on said arm or bar for movement laterally with respect to said arm or bar and forming the bearing for the yoke-sleeve, the lateral adjustment of said sleeve operating to move the yoke-sleeve laterally with respect to the coupling-arm, as and for the purpose set forth.

2. In a mowing-machine, the combination with a coupling arm or bar, a yoke sleeved thereon, and provided with a beveled bearing-surface at the end thereof, a shoe carried by said yoke, and a finger-bar and a cutter-bar carried by said shoe, of an adjusting-sleeve mounted on said drag-bar and provided with a beveled bearing-surface arranged to be received against the coöperating beveled bearing-surface formed at the end of the sleeve of said yoke, whereby wear of the bearing of said yoke upon said drag-bar may be compensated for, as and for the purpose set forth.

3. In a mowing-machine, the combination with a coupling arm or bar and a yoke sleeved thereon and provided with a beveled bearing-surface, of an adjusting-sleeve mounted upon said bar and forming the bearing for said yoke-sleeve, said adjusting-sleeve provided with a coöperating beveled or bearing surface, said adjusting-sleeve mounted for movement laterally with respect to said arm or bar, as and for the purpose set forth.

4. In a mowing-machine, a coupling arm or bar, a yoke sleeved thereon and provided with a beveled bearing-surface, an adjusting-sleeve mounted upon said bar for both lateral and longitudinal adjustment relative thereto, said adjusting-sleeve provided with a coöperating beveled bearing-surface, and means for clamping said sleeve in adjusted position, as and for the purpose set forth.

5. In a mowing-machine, the combination with a coupling arm or bar, of a yoke sleeved thereon, an adjusting-sleeve mounted on said bar for lateral movement relative thereto for taking up the wear of the yoke bearing upon said bar, and a wedge-key adapted to be inserted between said adjusting-sleeve and coupling arm or bar to adjustably move said sleeve laterally with respect to said bar and to hold the same in adjusted position, as and for the purpose set forth.

6. The combination with a coupling arm or bar, of a yoke sleeved thereon, an adjusting-sleeve mounted on said bar and projecting into the end of the yoke-bearing sleeve, said adjusting-sleeve provided with a tapering opening therethrough to receive the bar, and a wedge-key inserted in said tapering opening, whereby the position of the yoke relatively to the coupling arm or bar may be laterally adjusted, as and for the purpose set forth.

7. In a mowing-machine, a coupling arm or bar and a brace-bar pivotally connected to the frame of the machine, and an adjustable cross-brace connection between said coupling arm or bar and brace-bar, as and for the purpose set forth.

8. In a mowing-machine, a brace-bar and a coupling arm or bar, a finger-bar and a cutter-bar supported upon said coupling arm or bar, and a cross-brace connection secured at one end to said brace-bar and adjustably connected at its other end to said coupling arm or bar, as and for the purpose set forth.

9. In a mowing-machine, a brace-bar and a coupling arm or bar, a rod connected at one end to said brace-bar and at its opposite end adjustably connected to said coupling arm or bar, whereby the latter is braced, as and for the purpose set forth.

10. In a mowing-machine, a brace-bar and a coupling arm or bar, a yoke sleeved upon said coupling arm or bar, an adjusting-sleeve mounted on said coupling arm or bar and provided with an extension having an opening therethrough, a rod connected at one end to said brace-bar and having its other end passing loosely through said opening, and a nut for clamping said rod to said adjusting-sleeve, as and for the purpose set forth.

11. The combination with a brace-bar and a coupling arm or bar, of a sleeve mounted on said coupling arm or bar, and a cross-brace connected at one end with said brace-bar and having adjustable connection at its opposite end with said sleeve, as and for the purpose set forth.

12. The combination with a coupling arm or bar, of a yoke sleeved thereon, an adjusting-sleeve mounted upon said bar and forming a bearing for said yoke, said adjusting-sleeve provided with an extension, of a draft-link adjustably connected at one end to said extension and connected at the other end to the pole or tongue of the machine, as and for the purpose set forth.

13. The combination with a brace-bar and a coupling arm or bar, and a yoke sleeved upon said coupling arm or bar, of an adjusting-sleeve adjustably mounted upon said coupling arm or bar and engaging the sleeve-bearing of said yoke, said adjusting-sleeve provided with extensions, of a cross-brace connected at one end to said brace-bar and adjustably connected at the other end to one of the extensions of said adjusting-sleeve, and a draft-link connected at one end with another extension on said adjusting-sleeve and having connection at its opposite end with the tongue or pole of the machine, as and for the purpose set forth.

14. The combination with a shoe and a gag-lever, of a bell-crank lever, to one arm of which said gag-lever is connected, a foot-lever, adjustable connections between said foot-lever and the other arm of said bell-crank lever, and including a sleeve, an adjustable nut mounted thereon, a spring interposed and held in compression between the frame of the machine and said nut, whereby the expansive action of said spring tends to lift the shoe.

15. The combination with a shoe and a gag-lever, of a foot-lever, adjustable connections interposed between said foot-lever and gag-lever comprising a rod, a sleeve into which said rod is screwed, a nut adjustably mounted on said sleeve, a spring normally held in compression between said nut and the frame of the machine, whereby the expansive action of said spring tends to raise the shoe, as and for the purpose set forth.

16. The combination with a shoe and a gag-lever, of a foot-lever, a bell-crank lever, connections between said gag-lever and one arm of said bell-crank lever, a sleeve pivotally connected to the other arm of said bell-crank lever, and a rod pivotally connected to said foot-lever and adapted to be screwed into said sleeve, a nut mounted on said sleeve, and a spring carried by said rod and interposed and held in compression between the frame of the machine and said nut, whereby the expansive action of said spring tends to raise the shoe, as and for the purpose set forth.

17. In a mowing-machine, a shoe, a gag-lever, a bell-crank lever, connections between said gag-lever and one arm of said bell-crank lever, an operating foot-lever, connections between said foot-lever and the other arm of said bell-crank lever, and including a sleeve and a rod screwed into said sleeve, a bearing for one end of said spring, said bearing being pivotally mounted on the frame of the machine, said rod arranged to slide through said bearing, and a coöperating adjustable bearing carried by said sleeve and against which the other end of said spring bears, all combined and arranged as and for the purpose set forth.

18. In a mowing-machine, a shoe, a gag-lever, a bell-crank lever, a link connecting one arm of said bell-crank lever and said gag-lever, a foot-lever, an adjustable rod connection between said foot-lever and the other arm of said bell-crank lever, an arm pivotally mounted upon the frame of the machine and provided with a bearing through which said rod connection passes, a spring mounted upon said rod connection and arranged to bear at one end against said arm, an adjustable bearing mounted on said rod connection against which the other end of said spring bears, as and for the purpose set forth.

19. In a mowing-machine, a yoke, a gag-lever, a bell-crank lever pivotally mounted at its angle upon the frame of the machine and having one arm thereof connected to the gag-lever, a foot-lever also mounted upon the frame of the machine, a stop for limiting the rocking movement thereof, a rod connection pivotally connected respectively to said foot-lever and to the other arm of said bell-crank lever, whereby when said foot-lever is rocked said gag-lever is operated, the normal positions of the points of connection of said rod to said foot-lever and bell-crank being respectively on opposite sides of the plane containing the pivots of said levers, whereby by rocking said foot-lever beyond the dead-center connection between the same and said bell-crank lever the parts are locked, said foot-lever provided with a tailpiece or extension, whereby said lock can be conveniently released by the foot of the driver, as and for the purpose set forth.

20. In a mowing-machine, a shoe, a gag-lever, a foot-lever, a rod interposed between said foot-lever and gag-lever, an arm pivotally mounted upon the frame and connected to the rod, a spring mounted upon said rod and bearing at one end against said arm, and a bearing carried by said rod for the opposite end of said spring, whereby when said foot-lever is rocked said arm correspondingly rocks to maintain the bearing for said spring, as and for the purpose set forth.

21. In a mowing-machine, a coupling arm or bar, a yoke sleeved thereon for rotative adjustment, a shoe pivotally mounted upon said yoke, a gag-lever also mounted on said yoke and operating when actuated to engage and rock said shoe, a finger-bar carried by said shoe, a latch pivotally mounted on said yoke in position to automatically engage the finger-bar when in its raised position to lock or hold the same in such position, said latch provided with a tailpiece, a fixed part of the frame with which said latch coöperates and means for rocking said yoke upon the coupling arm or bar, whereby the latch-tailpiece is engaged by the fixed part to automatically release the latch from said finger-bar, as and for the purpose set forth.

22. In a mowing-machine, a brace-bar and a coupling arm or bar, a yoke sleeved upon said coupling arm or bar, a shoe pivotally mounted upon said yoke, a finger-bar mounted upon said shoe, a stud or boss formed on said yoke, a latch pivotally mounted on said boss or stud and independent of the gag-lever and having an engaging seat adapted to engage and lock the finger-bar when in its raised position, a spring operating on said latch to yieldingly maintain the same in engaging relation with respect to the finger-bar, a tailpiece connected to said latch, said brace-bar being arranged in the path of said tailpiece, a tilting-lever connected to said yoke to rock or tilt the same upon said coupling arm or bar, whereby said tailpiece is brought into engagement with said brace-bar to automatically release said latch, as and for the purpose set forth.

In witness whereof I have hereunto set my hand, this 28th day of February, 1902, in the presence of the subscribing witnesses.

PAUL HANSON.

Witnesses:
E. C. SEMPLE,
S. E. DARBY.